United States Patent
Balasubramanian et al.

(10) Patent No.: US 9,712,613 B2
(45) Date of Patent: Jul. 18, 2017

(54) FIBRE CHANNEL FABRIC COPY SERVICE

(75) Inventors: Shankar Balasubramanian, Sunnyvale, CA (US); Balakumar N. Kaushik, Sunnyvale, CA (US); Richard L. Hammons, Hollister, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 2957 days.

(21) Appl. No.: 10/425,567

(22) Filed: Apr. 29, 2003

(65) Prior Publication Data

US 2004/0230704 A1 Nov. 18, 2004

(51) Int. Cl.
*H04L 29/08* (2006.01)
*H04L 29/06* (2006.01)

(52) U.S. Cl.
CPC .......... *H04L 67/1095* (2013.01); *H04L 29/06* (2013.01); *H04L 67/1097* (2013.01); *H04L 69/329* (2013.01)

(58) Field of Classification Search
None
See application file for complete search history.

(56) References Cited

U.S. PATENT DOCUMENTS

| 6,343,324 | B1* | 1/2002 | Hubis et al. | 709/229 |
| 6,400,730 | B1* | 6/2002 | Latif et al. | 370/466 |
| 6,704,836 | B1* | 3/2004 | Griswold et al. | 711/113 |
| 6,772,290 | B1* | 8/2004 | Bromley et al. | 711/118 |
| 6,816,891 | B1* | 11/2004 | Vahalia et al. | 709/214 |
| 6,877,044 | B2* | 4/2005 | Lo et al. | 710/2 |
| 6,883,073 | B2 | 4/2005 | Arakawa et al. | |
| 6,944,732 | B2 | 9/2005 | Thunquest et al. | |
| 6,981,114 | B1 | 12/2005 | Wu et al. | |
| 7,139,845 | B2 | 11/2006 | Kaushik | |
| 7,197,047 | B2* | 3/2007 | Latif et al. | 370/466 |
| 2003/0005119 | A1* | 1/2003 | Mercier et al. | 709/225 |
| 2003/0126225 | A1* | 7/2003 | Camble et al. | 709/215 |
| 2003/0149830 | A1* | 8/2003 | Torr et al. | 711/100 |

(Continued)

FOREIGN PATENT DOCUMENTS

WO WO 02/071224 * 9/2002 ............. G06F 11/30

OTHER PUBLICATIONS

Fiber Channel Framing and Signaling American National Std. For IT, Jul. 9, 2001, rev.1.3, pp. 1-49.*

(Continued)

*Primary Examiner* — Backhean Tiv
(74) *Attorney, Agent, or Firm* — Blank Rome, LLP

(57) ABSTRACT

Copy capability moved into the SAN fabric and provided as a data mover service. A well-known address is utilized to receive copy commands from the hosts. Each switch in the fabric contains a front end or service interface which receives the copy command and manages access control or zoning and LUN mapping. LUN mapping and zoning are based on shared databases. Assuming correct zoning, the service interface will perform any necessary LUN mapping on the received copy command and forward the command to a copy engine to perform the copy operation. The switch service interface also maintains copy operation status, querying the copy engine if necessary, so that any host status requests are also simply handled. Additionally, if multiple copy engines are present, the switches can communicate to perform load balancing.

4 Claims, 7 Drawing Sheets

(56) References Cited

U.S. PATENT DOCUMENTS

2003/0189935 A1* 10/2003 Warden et al. .......... 370/395.21
2003/0208614 A1* 11/2003 Wilkes .......................... 709/232
2004/0078641 A1* 4/2004 Fleischmann ..................... 714/6
2004/0141498 A1 7/2004 Rangan et al.

OTHER PUBLICATIONS

Extended Copy Command, T10/99-143r1, Apr. 2, 1999.*
"Fibre Channel—Fabric Generic Requirements (FC-FG);" American National Standards Institute; ANSI X3.289-1996.
"Fibre Channel—Physical and Signaling Interface (FC-PH);" American National Standard for Information Systems; Jun. 1, 1994; pp. beginning-14, 98-99.
"Fibre Channel—Framing and Signaling (FC-FS);" NCITS working draft proposed American National Standard for Information Technology; Feb. 8, 2002; pp. beginning to 10, 80-81.
"Fibre Channel—Generic Services—3 (FC-GS-3);" American National Standards Institute; ANSI NCITS 348-2001, Jul. 31, 2001.

* cited by examiner

FIBRE CHANNEL FABRIC COPY SERVICE

BACKGROUND OF THE INVENTION

1. Field of the Invention

The invention relates to networks, more particularly to storage area networks (SANs) and yet more particularly to copying data between devices on the SAN.

2. Description of the Related Art

Storage Area Networks (SANs) are becoming more common as a means to lower storage costs and increase storage efficiency while increasing storage flexibility. One common function in an SAN is to copy data from one storage device to another, such as during a backup operation. Conventionally, this is done by the host computer issuing commands to read the data from the original location and write it to the desired location. This method requires extensive use of the host computer. Thus, it is relatively costly in terms of host requirements.

Some parties, such as Crossroads Systems Inc. and Chaparral Network Storage, Inc., provide copy engines which respond to the SCSI Extended Copy Command. Using these engines, the data is transferred directly between the storage devices by this dedicated hardware. Thus host usage is reduced. However, further complexities make such copy engines difficult to use. First, zoning in a SAN is difficult as the copy engine needs access to both devices, even though they would otherwise be in different zones. For more details on zoning, please refer to U.S. patent application Ser. No. 10/123,996 for "FIBRE CHANNEL ZONING BY DEVICE NAME IN HARDWARE" by Ding-Long Wu, David C. Banks and Jieming Zhu Filed Apr. 17, 2002 and Ser. No. 09/426,567 for "METHOD AND SYSTEM FOR CREATING AND IMPLEMENTING ZONES WITHIN A FIBRE CHANNEL SYSTEM," by David Banks, Kumar Malavalli, Paul Ramsay, Kha Sin Teow, and Jieming Zhu filed Oct. 22, 1999, both of which are hereby incorporated by reference. Further, each host using the copy facility would also have to be zoned to the facility, so this just adds great complexity to zoning schemes and may reduce security in many cases. Further, it is very common for hosts to have different LUN mappings than the internal LUNs on the storage devices. The copy engines do not comprehend these mappings, so each host must be manually configured to understand the various mappings and do conversions when using the copy service. This is a problem for a single host and rapidly becomes unmanageable with multiple hosts.

Thus copying data between storage devices on a SAN has many problems. It would be desirable to provide a simple facility to minimize host usage and administrative burdens such as zoning and LUN mappings.

BRIEF SUMMARY OF THE INVENTION

In embodiments according to the present invention, the copy capability is moved into the SAN fabric and provided as a data mover service. A well-known address is utilized to receive copy commands from the hosts. Each switch in the fabric contains a front end or service interface. The service interface of the switch connected to the host receives the copy command and manages access control or zoning and LUN mapping. LUN mapping and zoning are based on shared databases. Maintaining single, shared databases among the switches for LUN mapping and zoning greatly reduces administrator burden. By decoupling the need for the host to talk to the copy engine, zoning is greatly simplified as only the switches will be able to send commands to the copy engine, so the copy engine need only be zoned to have access to all of the desired storage devices, with no host access to the copy engine. Assuming correct zoning, the service interface will perform any necessary LUN mapping on the received copy command and forward the command to a copy engine to perform the copy operation.

The switch service interface will also maintain copy operation status, querying the copy engine if necessary, so that any host status requests are also simply handled. Additionally, if multiple copy engines are present, the switches can communicate to perform load balancing.

DETAILED DESCRIPTION OF PREFERRED EMBODIMENT

Figure 1:
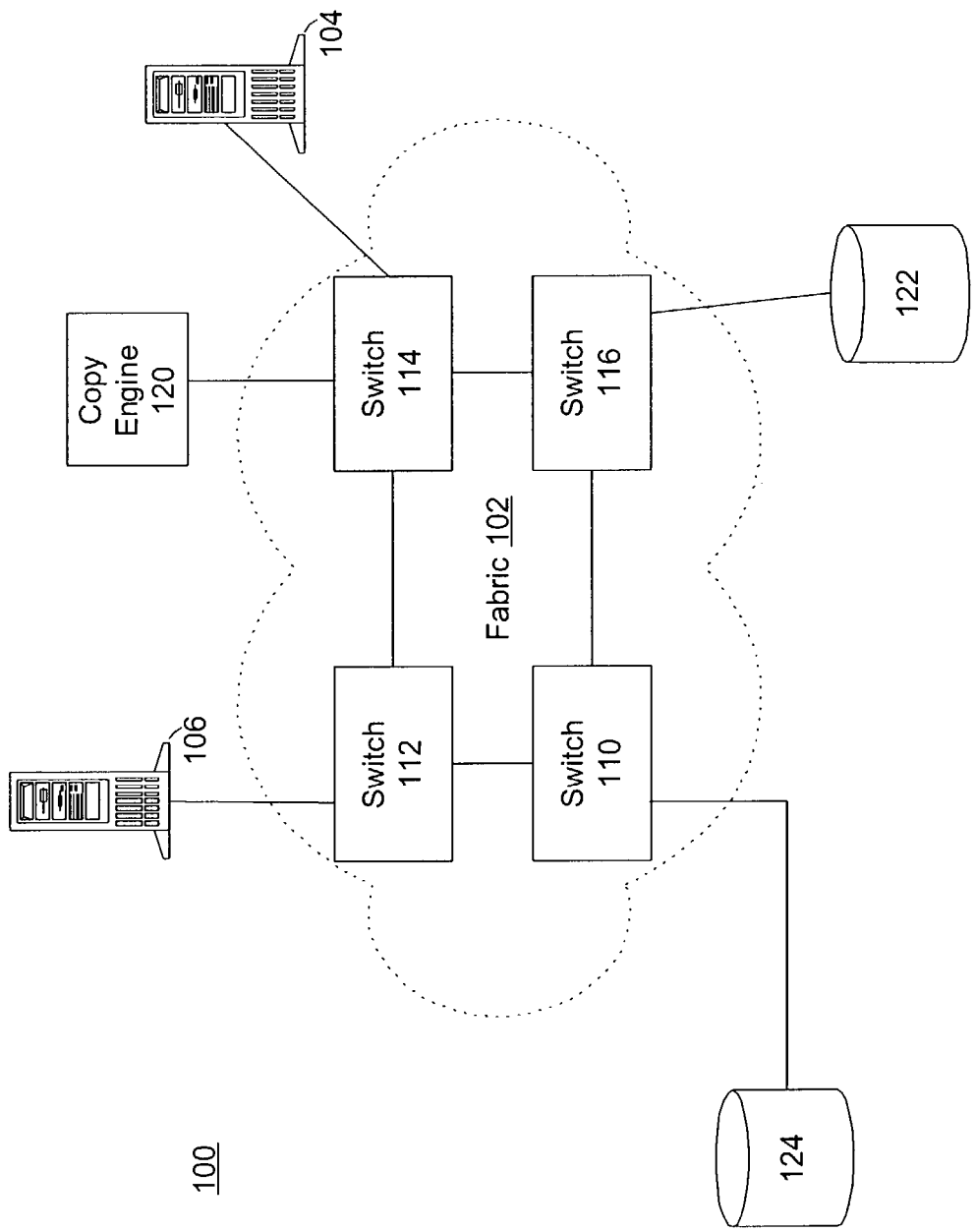
FIG. 1 is a block diagram of an exemplary network including a SAN according to the present invention.

Referring now to FIG. 1, a Fibre Channel network 100 is illustrated. Generally, the network 100 is connected using Fibre Channel connections (e.g., optical fiber and coaxial cable). In the embodiment shown and for illustrative purposes, the network 100 includes a fabric 102 comprised of four different switches 110, 112, 114, and 116. It will be understood by one of skilled in the art that a Fibre Channel fabric may be comprised of one or more switches. Two hosts 104 and 106 are connected to the fabric 102, and more particularly to switches 114 and 112. Additionally, a copy engine 120 is connected to switch 114. The copy engine 120 may be an independent device or a part of a larger device such as a tape unit or storage router. Storage devices 122 and 124 are connected to the fabric 102, specifically to switches 110 and 116. The storage devices 122 and 124 can be any type of storage device, such as a RAID array, a JBOD unit or a tape unit.

Figure 2:
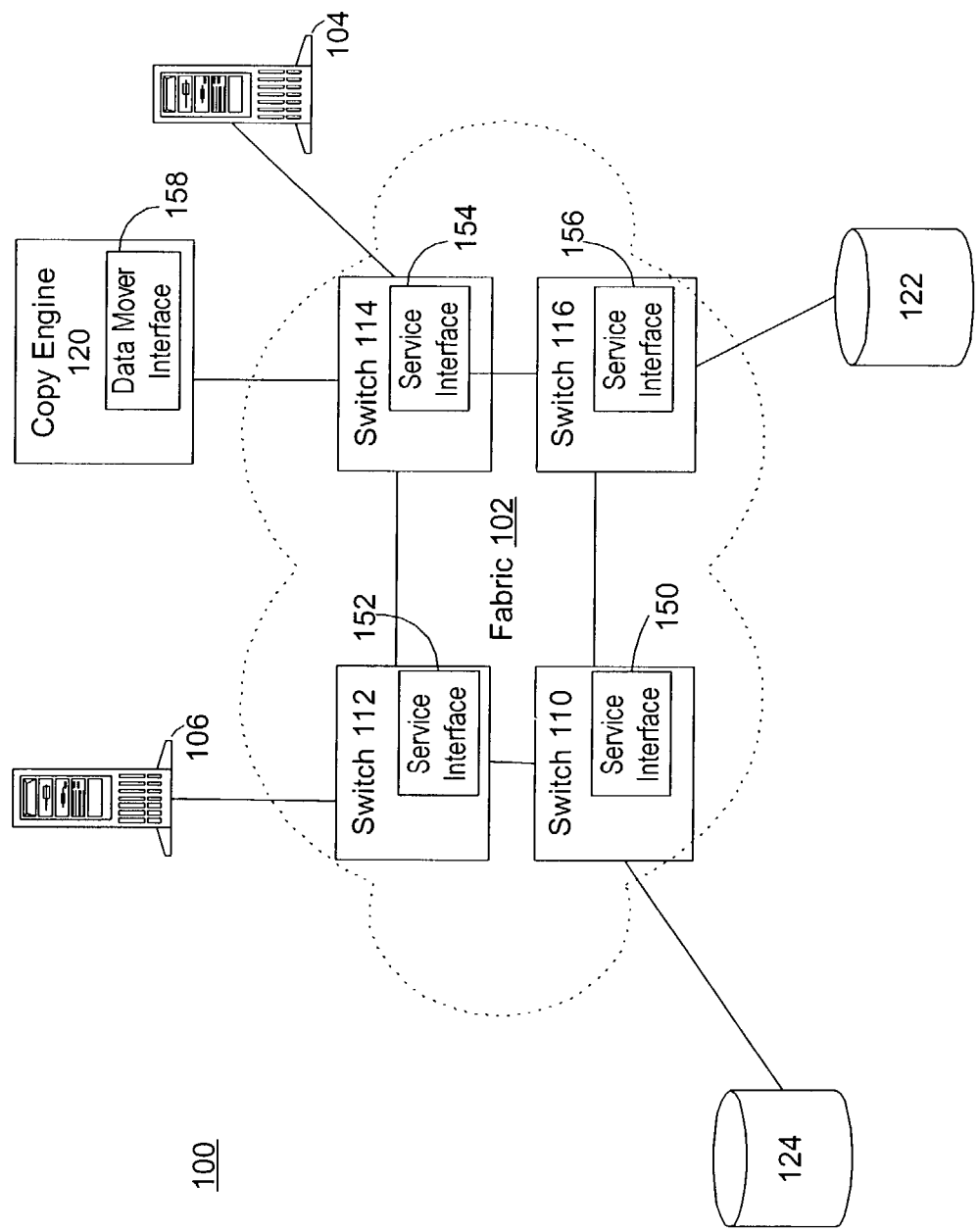
FIG. 2 is a more detailed view of the network of FIG. 1 illustrating the locations of the service interfaces and a data mover interface.

Referring now to FIG. 2, the switches 110-116 are shown including service interfaces 150, 152, 154 and 156 according to the present invention. Each of the service interfaces 150-156 responds to the well-known address FFFF FFFD or fabric controller address, and specifically to LUN 11 of that controller. Thus, should any host 104 or 106 desire to use the copy capability of the fabric 102, it provides a SCSI Extended Copy Command to LUN 11 at address FFFF FFFD. The extended copy command is an FCP command which includes the source and destination devices, LUNs, extents and so on, so that the full source, destination and length of the copy operation is identified. Additionally, this FFFF FFFD and LUN 11 location is the address where the host 104 or 106 would direct a Receive Copy Results FCP command to obtain status of a copy operation, either completed or in progress.

The service interfaces 150-156 cooperate with the administrator to develop a shared or replicated database of the LUN mappings between the various hosts and the various storage devices. In this manner, when a host requests a copy operation it need only use the LUNs it knows. A LUN mapping is not required to be kept in each host. The service interface 150-156 substitutes the proper LUN values for each storage device 122, 124 so that neither the host 104, 106 nor the copy engine 120 need perform the mapping or conversion. Thus, the administrator need only develop one database for the LUN mapping, allowing multiple host operation to be readily developed.

Administration is also simplified because the host need not be in the same zone as the copy engine. Because the Extended Copy command will emanate directly from a switch 110116, the copy engine 120 can be isolated from all hosts 104-106. Thus, the copy engine 120 can be placed in a zone with all of the desired storage devices 122, 124 without fear of security breeches, as the hosts 104, 106 will not have access to any storage device 122, 124 through the copy zone. Further, an additional duty of the service interface 150-156 is to inspect a copy zoning table to be sure that the host 104, 106 has authority to request a copy between the two specified devices and, if desired, the location or extents on those devices. This second database is also shared or replicated by the services interfaces 150-156 so that the administrator need only maintain one database of the allowed copy zones. A data mover interface 158 is provided in the copy engine 120 to interface with the service interfaces 150-156.

Figure 3:
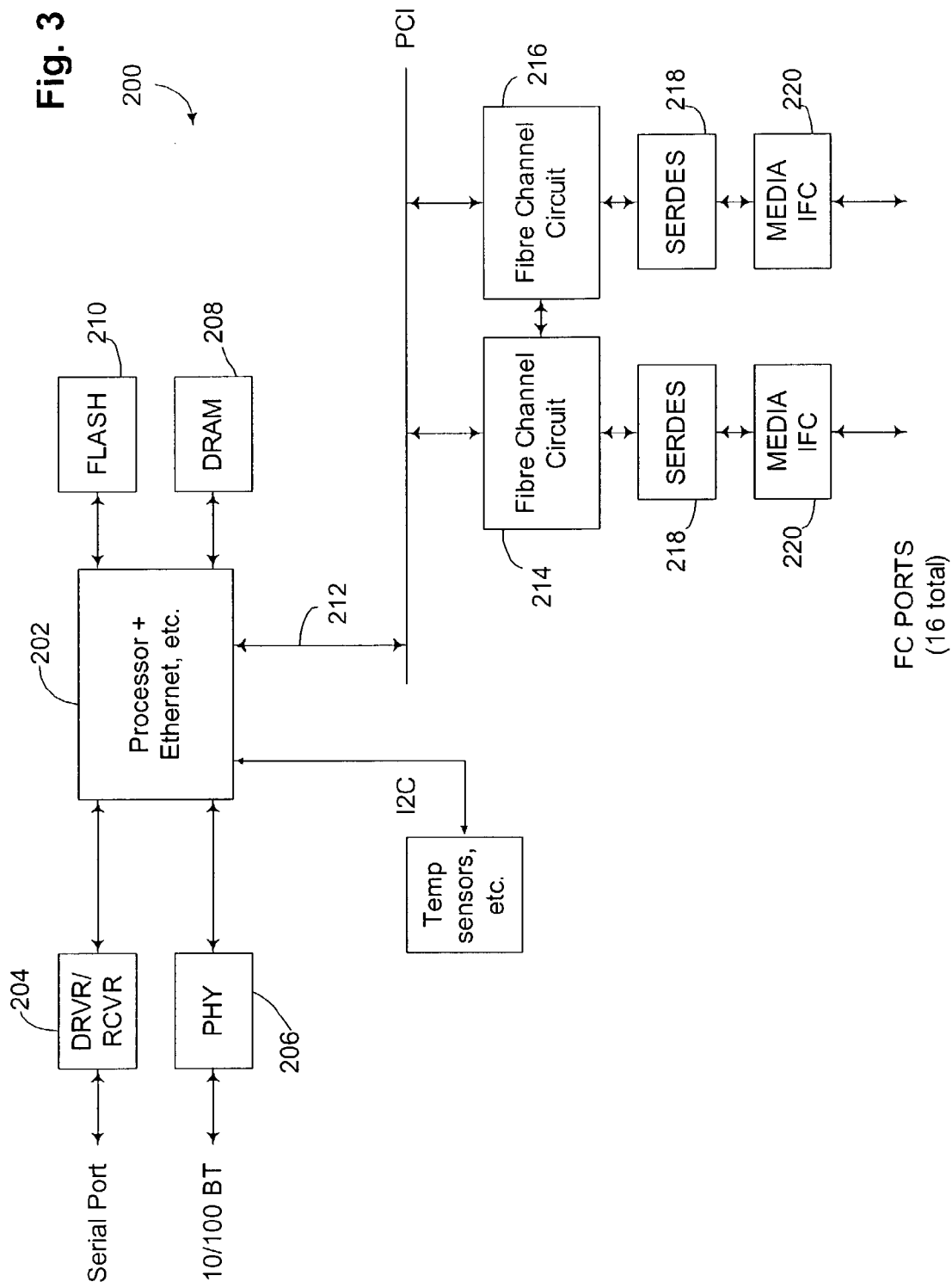
FIG. 3 is a block diagram of an exemplary switch.

FIG. 3 illustrates a basic block diagram of a switch 200, such as switches 110, 112, 114, or 116 according to the preferred embodiment of the present invention. A processor and I/O interface complex 202 provides the processing capabilities of the switch 200. The processor may be any of various suitable processors, including the Intel i960 and the Motorola or IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor.

The processor complex 202 also includes an I/O bus interface 212, such as a PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices.

Figure 4:
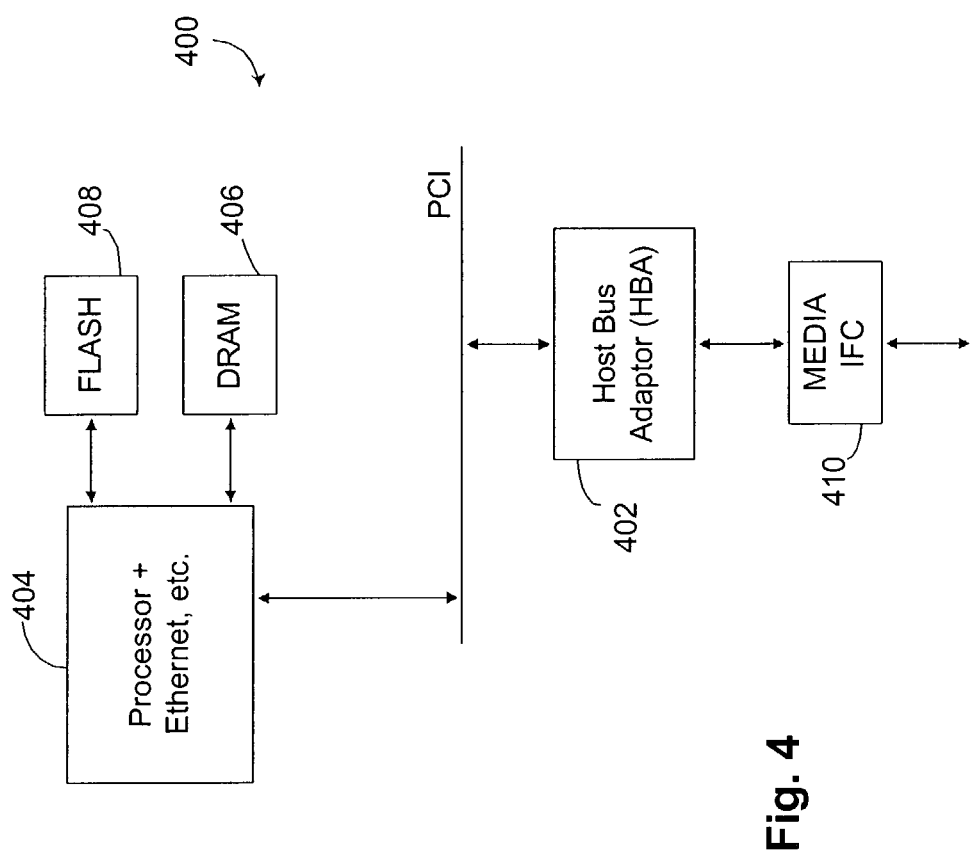
FIG. 4 is a block diagram of an exemplary copy engine.

Referring now to FIG. 4, a block diagram of a simple copy engine 400 is shown. A host bus adapter (HBA) 402 is connected to a processor and I/O interface complex 404. DRAM 406 and FLASH ROM 408 are connected to the processor 404 to provide working memory and program storage. A media interface 410 is connected to the HBA 402. The copy engine 400 will receive SCSI Extended Copy Commands from the service interfaces 150-156 in the switches 110-116. The data mover interface 158 will translate these commands as reads to the copy engine 400 from the originating or source storage device 122, 124 and writes from the copy engine 400 to the destination storage device 122, 124. The service interfaces 150-156 will have already translated any host LUNs into the proper storage device LUNs, so the FCP commands provided by the copy engine 400 will be very simple. Beyond, that the copy engine 400 need only be able to do conventional Fibre Channel fabric operations and handle any errors that may occur in the copy process.

As can be seen, the block diagrams of a switch 200 and the copy engine 400 are similar, so that the software required to perform the copy engine functionality can be added to the switch 200, preferably along with additionally RAM to allow more buffer storage space, provided sufficient processor throughput is available. If not, processor performance can be increased as necessary.

Figure 5:
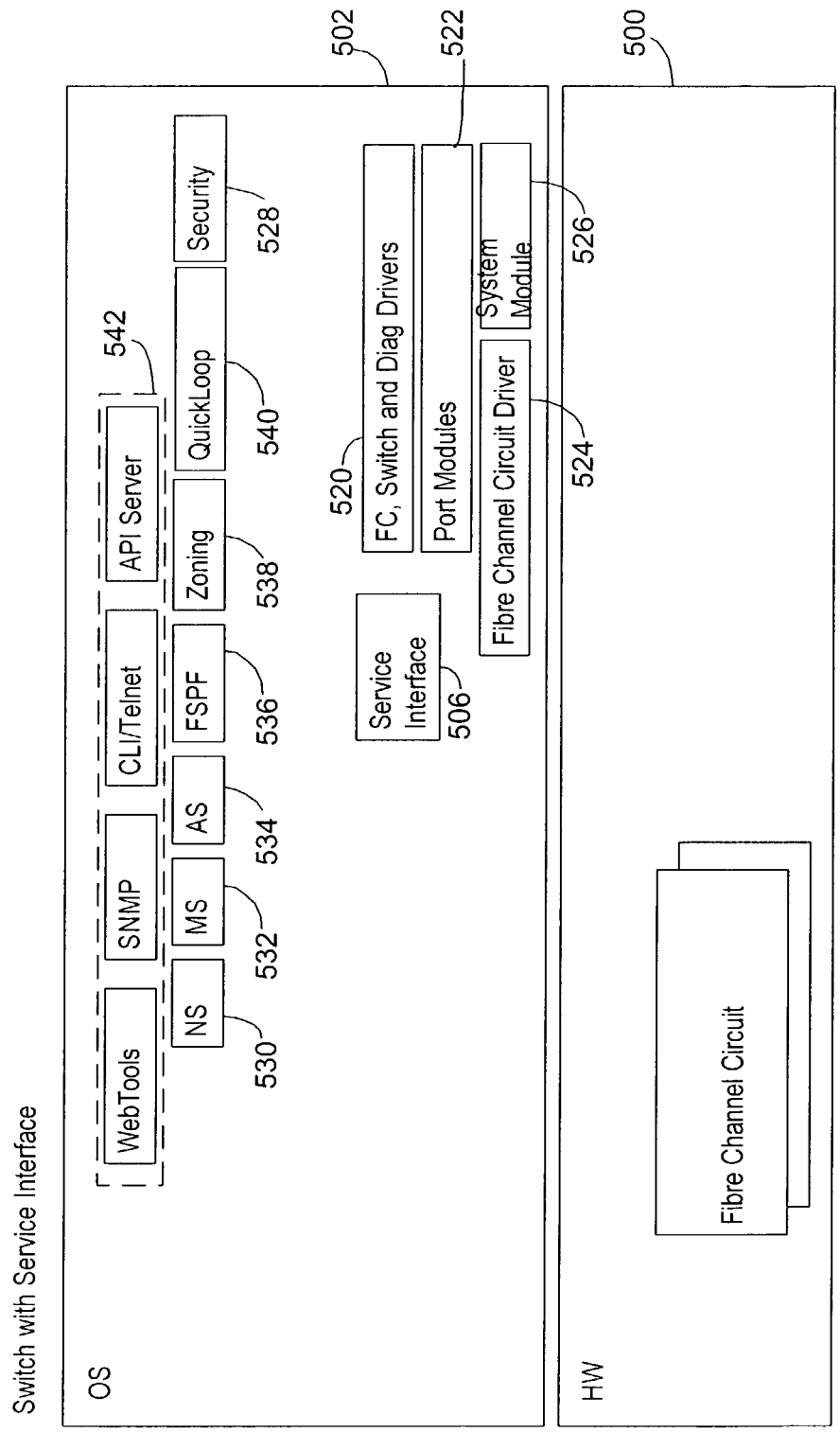
FIG. 5 is a software diagram of a switch including a service interface according to the present invention.

Proceeding then to FIG. 5, a general block diagram of the switch 110-116 hardware and software is shown. Block 500 indicates the hardware as previously described. Block 502 is the basic software architecture of the switch 110-116. Generally think of this as the switch operating system and all of the particular modules or drivers that are operating within that embodiment. A service interface module 506 provides the service interface functionality described above. Other modules operating on the operating system 502 are Fibre Channel, switch and diagnostic drivers 520; port modules 522, if appropriate; a driver 524 to work with the Fibre Channel circuits; and a system module 526. In addition, because this is a fully operational switch, the normal switch modules for switch management and switch operations are generally shown. These other switch modules include a QuickLoop module 540 to handle private-public address translations, a zoning module 538, an FSPF or Fibre Shortest Path First routing module 536, an AS or alias server module 534, an MS or management server module 532, a name server module 530 and a security module 528. Additionally, the normal switch management interface 542 is shown including web server, SNMP, telnet and API modules.

Figure 6:
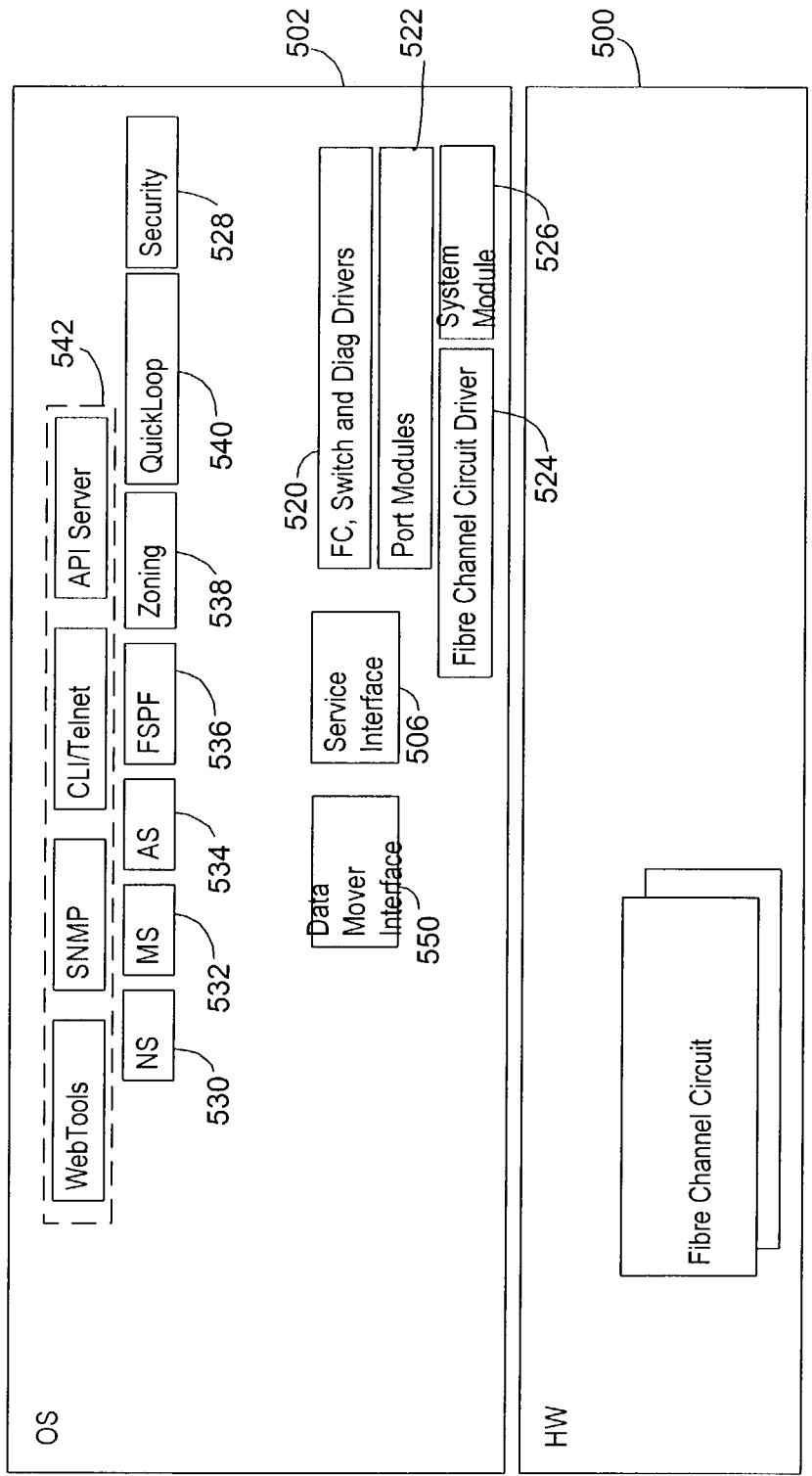
FIG. 6 is a software diagram of a switch including both a service interface and a data mover interface according to the present invention.

FIG. 6 illustrates the software block diagram of a switch according to FIG. 5 where the data mover interface or copy engine functionality has been added, as shown by the inclusion of a data mover interface module 550. One advantage of this variation is that messaging between the service interface module 506 and the data mover interface module 550 is simplified because it can be handled by interprocess communications, without requiring frame development and disassembly.

Figure 7:
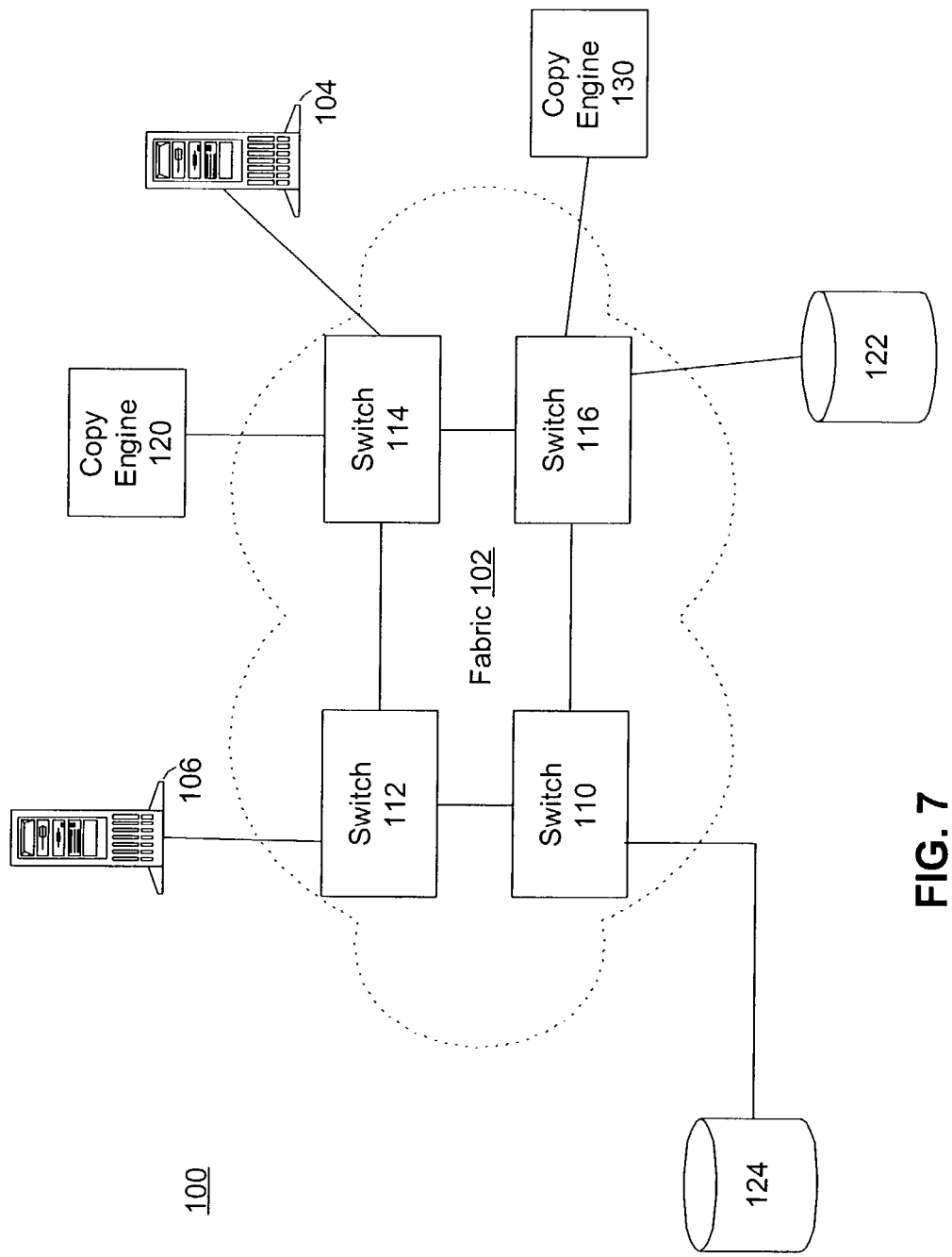
FIG. 7 is the block diagram of FIG. 2 with an additional copy engine.

FIG. 7 illustrates an additional copy engine 130 connected to the fabric 100. In this embodiment the service interfaces 150-156 communicate to coordinate use of the copy engines 120 and 130 to best balance their use. Zoning in this embodiment would be similar to FIG. 2, with each copy engine 120, 130 being in a zone to access all of the storage devices 122, 124. Alternatively, the copy engines 120-130 could be in different zones, so long as copies could be made between necessary storage devices 122, 124. The service interfaces 150-156 would then select a copy engine 120, 130 having access to the needed storage devices 122, 124 and then perform load balancing, if possible Therefore, a simple mechanism and method have been shown where data copying becomes a fabric facility, with service interfaces in each switch coordinating with attached hosts and controlling a copy engine or engines connected to the fabric through a data mover interface. Host usage is reduced and management complexity is reduced in this arrangement.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

The invention claimed is:

1. A network device for use in a Fibre Channel fabric, with a host, a copy engine and two storage devices coupled to the Fibre Channel fabric, wherein there are a plurality of zones in the Fibre Channel fabric and wherein the host is not in a zone with the two storage devices, the network device comprising:
   a first port for connection to the host;
   a second port for coupling to the copy engine; and
   a module coupled to said first port and said second port for confirming that the host has zoning authority to request the copy between the storage devices, for receiving a copy command, directing copying of data between the storage devices, provided by the host to a well known address and for transmitting a copy command, directing copying of data between the storage devices, directed to the copy engine.

2. A Fibre Channel fabric, with a plurality of hosts, at least one copy engine and a plurality of storage devices, wherein there are a plurality of zones in the Fibre Channel fabric, the Fibre Channel fabric comprising a plurality of interconnected switches, each switch including:
   a first port for connection to one of the plurality of hosts, wherein the one of the plurality of hosts is not in a zone with the two storage devices;
   a second port for coupling to the copy engine; and
   a module coupled to said first port and said second port for confirming, that the one of the plurality of hosts has zoning authority to request the copy between the storage devices, for receiving a copy command, directing copying of data between two of the plurality of storage devices, provided by the one of the plurality of hosts to a well known address and for transmitting a copy command, directing copying of data between the two storage devices, directed to the copy engine.

3. A network comprising:
   a plurality of hosts;
   at least one copy engine;
   a plurality of storage devices; and
   a plurality of interconnected switches forming a Fibre Channel fabric, wherein there are a plurality of zones in the Fibre Channel fabric, and each switch including:
   a first port for connection to one of the plurality of hosts, wherein the one of the plurality of hosts is not in a zone with the two storage devices;
   a second port for coupling to the copy engine; and
   a module coupled to said first port and said second port for confirming that the one of the plurality of hosts has zoning authority to request the copy between the storage devices, for receiving a copy command, directing copying of data between two of the plurality of storage devices, provided by the one of the plurality of hosts to a well known address, and for transmitting a copy command, directing copying of data between the two storage devices, directed to the copy engine.

4. A method of operating a network device in a Fibre Channel fabric, with a host, a copy engine and two storage devices coupled to the Fibre Channel fabric, wherein there are a plurality of zones in the Fibre Channel fabric and the host is not in a zone with the two storage devices, the method comprising:
   confirming that the host has zoning authority to request the copy between the storage devices;
   receiving a copy command, directing copying of data between the storage devices, provided by the host to a well known address at a first port; and
   transmitting a copy command, directing copying of data between the storage devices, directed to the copy engine from a second port for coupling to the copy engine.

* * * * *